July 1, 1969 C. E. HOOVER ET AL 3,452,871
WOOD PRODUCT FOR WATER AND SEWAGE TREATMENT
Filed April 10, 1967
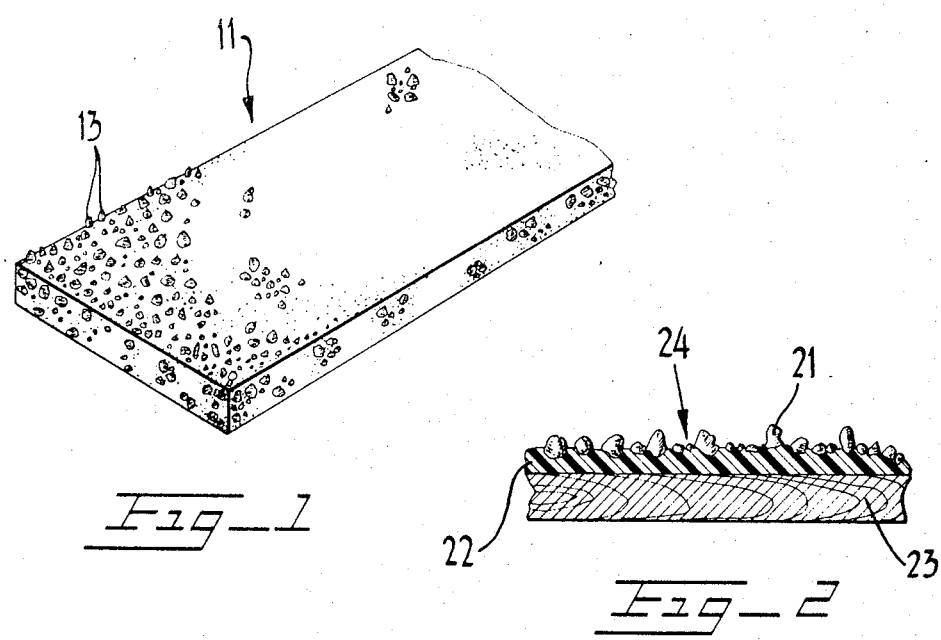
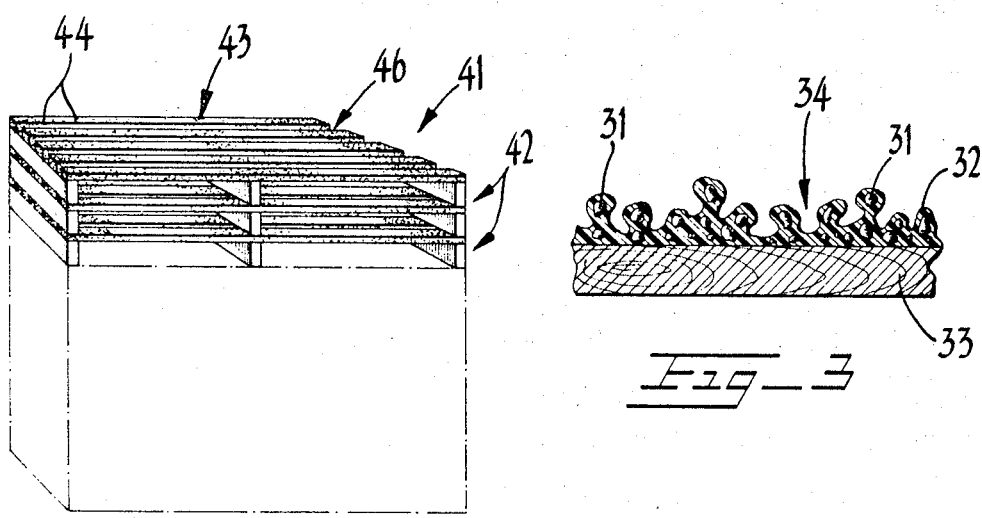
INVENTORS
CARL E. HOOVER
OTIS E. FINLEY
ATTORNEYS

United States Patent Office 3,452,871
Patented July 1, 1969

3,452,871
WOOD PRODUCT FOR WATER AND SEWAGE TREATMENT
Carl E. Hoover, San Leandro, and Otis E. Finley, Fremont, Calif., assignor of one-sixth each to Victor P. Jakub, and Clyde B. Mitchell, both of Hayward, Calif.
Filed Apr. 10, 1967, Ser. No. 629,595
Int. Cl. B01d 23/02
U.S. Cl. 210—150                12 Claims

ABSTRACT OF THE DISCLOSURE

A surface coated wood product, especially for the construction of trickling filters, comprising a waterproofed wood or wood fiber base, having a layer of rock or gravel bonded to the surfaces thereof by means of an acrylic resin, to provide extended filter service life and improved retention of biologically active bacteriaphases.

Background of the invention

The invention generally relates to materials for the construction of water and sewage treatment equipment and comprises wood, or wood substitute substrates which are surface coated with a polymer bonded layer of rock fragments providing an irregularly textured surface which promotes the growth and retention of a bacteriostatic surface coating and protects the substrate against decay.

The principal, but by no means the only aspect of the utility of the present invention is related to the disposal and treatment of sewage, particularly to the construction of trickling filters. The objectives of all sewage treatment processes are to remove organic wastes, destroy pathogenic bacteria in the sewage, and reestablish an acceptable and stable level of dissolved oxygen in the water. The common key means for achieving these objectives are filtration and settling of suspended solids, aeration and promotion of antibiosis, and ultimately dilution of the treated liquid effluent. The incoming raw sewage is generally subjected to a preliminary treatment aimed at producing a slurry of finely divided suspended solids by mechanically shredding and digesting paper and other coarse solids. The resulting slurry is then routed to a settling tank where the heavier solids settle to the bottom, leaving a supernatant liquid suspension of finer and lighter solids. At this stage the sewerage is virtually depleted of all its dissolved oxygen. The remaining solids are chiefly organic matter, including a flora of microorganisms, some of which are pathogenic anaerobic bacteria. This matter is destroyed by a combination of oxidation and biological action, both of which depend vitally upon the presence of oxygen in the water. Accordingly, at this stage the sewage is aerated, i.e., saturated with air, in order to resupply the oxygen needed to convert the organic matter into carbon dioxide, water, and nitrates. At the same time the presence of oxygen promotes the growth of an aerobic flora which includes protozoa and a number of other microorganisms which feed upon and hence remove the anaerobic and pathogenic bacteria. The progress in the purification of sewerage is usually monitored in terms of the level of dissolved oxygen (DO) which indicates the prevailing oxygen concentration in the sewerage water, and the biological oxygen demand (BOD) which is a measure of the rate at which oxygen is consumed by the sewerage as a result of the continual oxidation processes. The BOD level has to be lowered to an acceptable minimum prior to diluting the sewerage by allowing it to flow into a body of fresh water since the sewerage would otherwise deplete the fresh water of its available oxygen, killing fish and giving rise to anaerobic pollution conditions.

Historically the oldest method of treating sewerage after it has been digested and settled is to run the sewerage over a gravel bed filter which consists essentially of a bed of crushed rock over a subterranean tiled surface. These filters are still in use today, chiefly because their filter action at high efficiencies removes suspended solids while simultaneously aerating the sewerage as it trickles through the rock onto the tile. The rock surfaces are highly efficient in collecting a slimy scummy layer rich in a flora of protozoans and other microorganisms which consume pathogenic bacteria, and which also aids in the removal of finely suspended solids. A disadvantage, however, is the fact that this slimy layer grows and ultimately clogs the bed, giving rise to a continuous and difficult maintenance and revitalization problem.

The maintenance problem posed by the rock bed filter was successfully avoided by the use of redwood filter racks of the type shown in FIGURE 4. It was discovered that the rough surface of cut redwood is also very efficient in promoting and retaining the growth of an organic layer of material which supports the protozoans and traps finely suspended solids as the sewerage is sprinkled over the filter. This filter does not clog, hence requiring considerably less maintenance. These racks are, however, relatively expensive, and have to be replaced from time to time since the wood deteriorates and decays.

In order to avoid the deterioration and replacement problem it has been attempted previously to construct the filter racks of more durable materials, particularly plastics. However, the performance of these filters has been unsatisfactory, chiefly because of the high cost of these filters and because no adequate organic layer is formed on the filter surfaces to sustain effective antibiosis. Various treatments to form depressions and to undulate the surfaces of the filter materials have done little to improve the filters in this regard.

Summary of the invention

We have now developed a wood product which is ideally suited for the construction of trickling filters, and which is also advantageously employed in other water aerators, cooling towers and the like. The present product has the combined advantages of relatively low cost, long service life and minimal deterioration in the presence of water even when loaded with caustic wasteproducts. In addition, the surface texture of the present filter material promotes the growth of an algaeous layer which is rich in biological bacteriorphages and an effective filter for suspended solids in the water. The principal feature of he invention is a surface coating which is applied to wood or a woodlike substrate which protects the substrate from the action of water and waste materials. The coating is a composite of a bonding agent, such as an acrylic adhesive, and rock fragments, gravel, or sand or the like, which is at least partially imbedded in the bonding agent matrix. The exposed mineral surfaces of the rock, or, as when completely surrounded by the bonding material, the size and shape of the rock fragments, confer upon the coating surface a nature or texture which has a high affinity for a bacteriostatic flora.

In summary then, the principal object of the present invention is to provide an inexpensive wood product which is capable of withstanding the action of water and waste materials.

Another object of the invention is to provide a coating for wood products which provides sites for attachment and growth of algeal matter to support a bacteriostatic and bacteriocidal medium.

Still another object of the invention is to provide a baffle material which, when exposed the flow of water will promote the aeration thereof.

The invention possesses other objects and features of advantage some of which, together with the foregoing will be set forth in the following description of the preferred form of the invention, which is illustrated in the accompanying drawings. It is to be understood, however, that modifications and variations in the showing made in the drawings and description may be adopted within the scope of the invention as set forth in the following claims.

In the accompanying drawings of the preferred embodiments of the invention:

FIGURE 1 illustrates a coated wood product lath in perspective,

FIGURE 2 is a cross sectional view of a preferred form of the coated product,

FIGURE 3 is a cross sectional view of another embodiment of the coated product, and FIGURE 4 shows a typical trickling filter unit in perspective.

Description of the preferred embodiments

Referring now to the drawings, FIGURE 1 shows a coated baseboard or slab 11, having its upper surface and side completely covered with a solidified mixture of rock fragments or mineral particles 13 firmly held in place by an interstitial bonding agent matrix. For use in sewage treatment applications as well as otherwise, it is normally preferred for sake of convenience to coat only the top and sides of the slab, i.e., the surfaces upon which the water stream impinges. However, while no rock fragments need be applied to the underside it should be thoroughly sealed and waterproofed to prevent deterioration. The preferred substrate material is woodfiber board, such as marketed under the tradename of Masonite, for example, pine, and similar inexpensive woods, although the operability of the invention per se is, of course, not impaired by using other types of wood. The rock, or mineral fragments may be crushed rock, sand, limestone, and volcanic materials such as pumice, lava, scoria and the like. The particle size should be between about .02 and about 3/16 inch, as discussed further below. The wood or wood substitute substrate is preferably pretreated and thoroughly impregnated with a sealer or other waterproofing agent such as are commonly used for priming exteriorly used woods, such as solvent phase acrylic and alkyd resins for example.

The choice of binder is of particular importance, since it has to satisfy the requirements of withstanding the action of the sewerage for prolonged periods, maintaining a tight seal over the wood surfaces, and providing a lasting bond between the wood substrate and the rock fragments. It has been found that the binders which are best able to satisfy these requirements, and which pose no undue problems from the point of view of manufacture are the acrylates and methacrylates, polyvinyl acetate, polyvinyl C chloride, polystyrene, and the glyptal resins.

FIGURES 2 and 3 show preferred fine structures of the coating material in cross section. With reference to FIGURE 2, the rock particles 21 are partially imbedded in binder 22 which seals the wood substrate 23 and holds the rock materials firmly attached thereto. Irregularly fractured rock fragments of somewhat larger size, i.e., between about 1/16 inch and about 3/16 are preferred because they are engaged more securely by the binder material. Any of the binder enumerated above may be employed to secure the rock fragments. In the embodiment shown in FIGURE 2, the rock surfaces themselves as well as the depressions and reentrant cavities 24 provide sites for the attachment and growth of the biological bacteriophages referred to above.

The embodiment shown in FIGURE 3 differs from that of FIGURE 2, in that rock fragments 31 are completely imbedded in the binder material 32 which again serves to seal the wood substrate 33 as well as binding the rock particles thereto. The rock fragments are preferably of smaller size, e.g., about .02 to 1/32. In order to convey a more irregular reentrant structure upon the outer surface, the particles should be applied in more copious quantities. The sites for growth and retention of the biologically active material are the reentrant cavities and depressions 34. The preferred binder material are the acrylates and methacrylic resins, which, for unknown reasons, appear to sustain a more copious and active layer of the biologically active surface layer as well as being productive of improved DO and BOD readings.

For the manufacture of the present wood product it is preferable although not absolutely necessary to employ a roughly cut wood, in order to improve the bond between the binder matrix and the wood surface. The wood substrate is preferably treated with a preservative, water repellent, or sealer before the coating is applied. For example, the wood substrate may be sealed by immersion into a low viscosity bath of an acrylic resin of about 22% by weight acrylic polymer in ketone solvent. In general, the pretreated wood slabs are first immersed in a bath of the binder and withdrawn. Then, while still wet, the rock fragments are applied to the surface, which is conveniently accomplished by passing over the surface a suitable dispenser which releases a predetermined quantity of the sand or rock fragments per inch of travel.

In order to produce a coating of the structure, the binder coating should be somewhat thicker. This is done by preparing a binder bath of higher viscosity so that a thicker coating adheres to the dipped substrates. It may also be desirable to prolong the time required for the resin to set. These adjustments are readily made by controlling the amounts and type of solvent in which the resin is dissolved. Thus, to reduce the viscosity, smaller quantities of solvent are employed, generally in the range of about 30 to 40 percent by weight. If it is desired to provide additional time in order to allow impressing the rock fragments into the binder for example, a solvent of lower volatility may be substituted.

In order to provide a coating having the fine structure shown in FIGURE 3, the wood substrates are dipped into a low viscosity binder bath as previously. For example, a bath comprising about 40 percent by weight acrylic resin and the remainder ketone solvent is satisfactory. The substrate is removed, and while still tacky, is covered with a layer of sand or rock. The rock or sand is in turn sprayed with resin in order to embed and bond the rock fragments and wood substrate together. It is important to apply the final cover layer sparingly in order to insure that the interstices between the rock fragments are not completely filled with resin. The resin spray is preferably highly dilute, e.g., about 80 percent by weight volatile solvent for improved control of the quantity of resin applied as well as more even distribution and coverage.

It will be readily realized that the binder could be applied with spray guns throughout or any other suitable means. Similarly, the polymer may include various quantities of plasticizer, especially if applied to relatively thin substrates. If alkyd resins are employed, it is generally preferred to add a quantity of monocarboxylic acids to prevent cross-linking and excessive stiffness of the coating. Thus, the danger of loosening the surface coatings due to flexing the substrate can be avoided.

FIGURE 4 shows an assembled trickling filter 41 comprised of superposed pallets 42 of laths 43, each having its coated surface 44 facing upwards in the direction of the spray nozzles of the sewage water dispensing system (not shown). A clearance 46 of about 3/4 inch is maintained between adjacent laths to prevent clogging due to accumulated solids. The laths in the successive pallets may be secured in a staggered arrangement as shown.

Example

A trickling filter was constructed by dipping strips of pressed fiberboard of a thickness of 1/8 inch into a solvent phase acrylic sealant having a solvent proportion of about 75 percent by weight, marketed under the designation SL–9 by Pacific Chemicals Corporation. Subsequently the fiberboards were dipped into a binder bath consisting of 42 percent acrylic resin dissolved in a solvent. While still wet, the fiberboard was covered on its rough side with a layer of #3 sandblasting sand, which in turn was sprayed with dissolved acrylic resin of similar composition as the binder bath. After covering, the boards were assembled into a trickling filter rack of the type shown in FIGURE 4.

The performance of the filter was tested in a primary and secondary treatment plant of a capacity of 4.5 million gallons/day at San Bruno, Calif. Forty-seven days after installing and operating the filter units, sufficient biological growth had developed to remove 35% BOD and 42% of suspended solids from processed sewage, while raising the DO level to 2.5 parts per million. After operation of the filter for an additional 27 days, biological growth continued to rise to remove 52% BOD and 58% suspended solids from treated sewage, while raising the DO level to 3.8 p.p.m. After an additional 18 days the biologically active layer had matured to the point where 74% BOD and 90% suspended solids were removed from sewage and the level of DO was raised to 6 p.p.m. The filter showed no signs of deterioration or attack whatever.

Having described what may be considered preferred embodiments of the invention, it will be apparent, that changes and modifications may be made without departing from the true spirit of the invention as set forth in the following claims.

What is claimed is:

1. A trickling filter for the treatment of sewage comprising a plurality of spaced laths over which said sewage is to be passed, each of said laths including a substrate base having the surfaces thereof to be contacted by said sewage coated with a composite facilitating growth and retention of a bacteriostatic coating, said composite comprising a plastic resin binder matrix having rock particles imbedded therein to provide said surfaces with an irregular outer structure.

2. The article of claim 1 further defined in that the material of said substrate is wood.

3. The article of claim 2 further defined in that said wood is impregnated with a preservative.

4. The article of claim 2 further defined in that said wood substrate material is impregnated with a sealant.

5. The article of claim 1 further defined in that the diameter of said rock particles is between about .02 and 3/16 inch.

6. The article of claim 1 further defined in that said binder is a polymeric selected from the group consisting of polyacrylate, polyvinyl acetate, polyvinyl chloride, polystyrene, and glyptal resins.

7. The article of claim 1 further defined in that the material of said substrate is a wood fiber composite.

8. The article of claim 1 further defined in that said rock particles are selected from the group consisting of limestone, sandstone, pumice, lava, basalt, sand and gravel.

9. The trickling filter of claim 1 wherein said laths are arranged in a plurality of vertically superposed pallets over which said sewage is to be passed by gravity, the laths in vertically adjacent pallets being horizontally staggered relative to one another.

10. The trickling filter of claim 9 wherein the material of the substrate base of each of said laths is pressed fiberboard treated with a solvent phase acrylic sealant, said binder matrix is acrylic resin and said rock particles are sand.

11. The trickling filter of claim 1 wherein said rock particles are completely covered by said plastic resin binder and have a diameter in the range between about .02 inch and 1/32 inch.

12. The trickling filter of claim 1 wherein said rock particles are partially imbedded in said plastic resin binder and have a diameter in the range between about 1/16 inch and 3/16 inch.

References Cited
UNITED STATES PATENTS

| | | | |
|---|---|---|---|
| 1,131,740 | 3/1915 | Schwarz | 117—33 |
| 2,037,268 | 4/1936 | Reeve | 117—33 X |
| 2,366,025 | 12/1944 | Hall | 117—33 |
| 2,544,733 | 3/1951 | Shuler | 117—33 X |
| 2,955,064 | 10/1960 | Frohmader | 261—94 X |
| 3,049,436 | 8/1962 | Stewart et al. | 117—33 X |
| 3,168,411 | 2/1965 | Walsh | 117—26 |
| 3,231,490 | 1/1966 | Fry | 210—150 |

REUBEN FRIEDMAN, *Primary Examiner.*

J. ADEE, *Assistant Examiner.*

U.S. Cl. X.R.

261—112